Dec. 6, 1966 W. R. VAN DER VEER ETAL 3,289,468
ULTRASONIC TRANSDUCER POSITIONING APPARATUS
Filed May 29, 1963 3 Sheets-Sheet 1
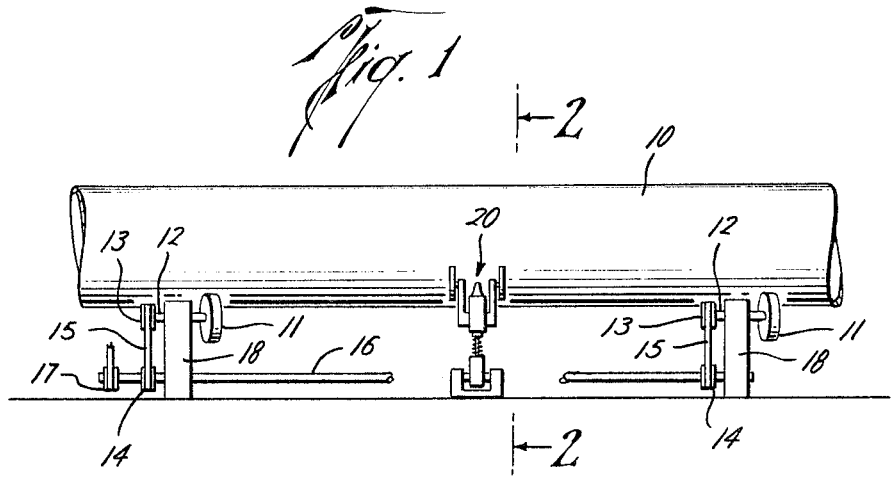
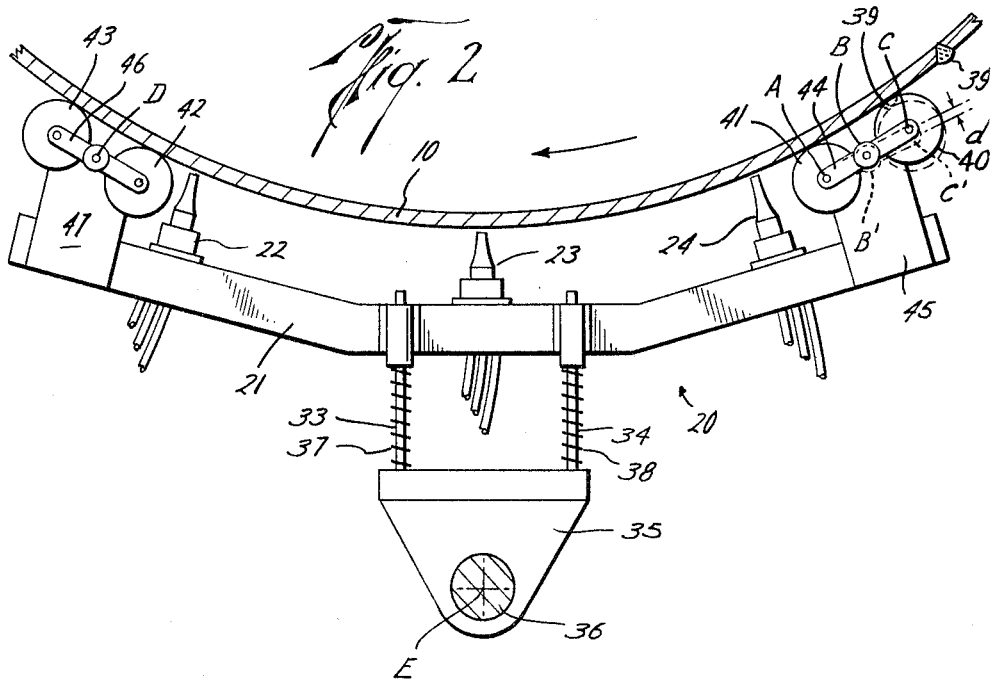
William R. Van der Veer
Walter A. Gunkel
INVENTORS
BY Browning, Simms,
Hyer & Eickenroht
ATTORNEYS

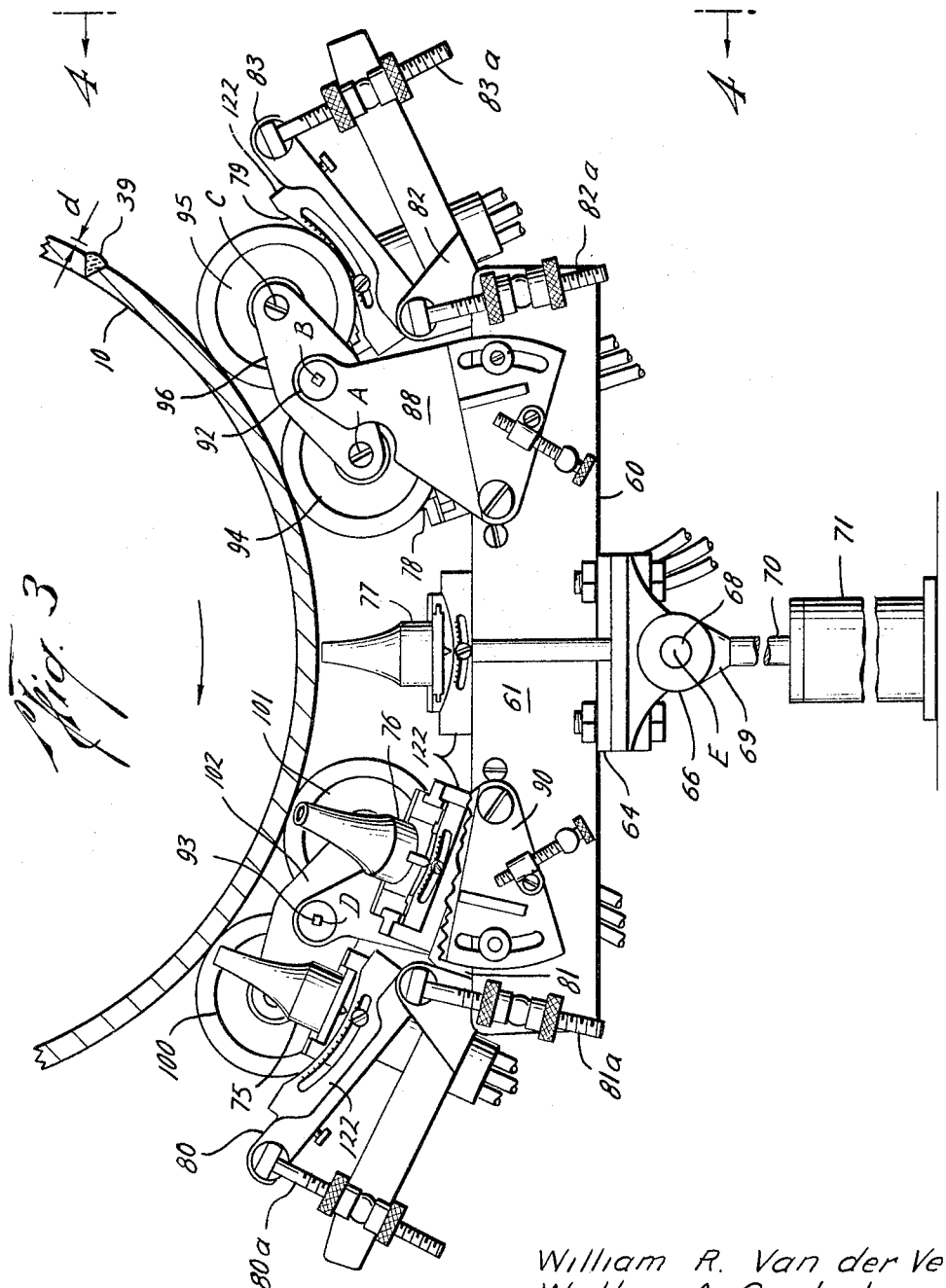

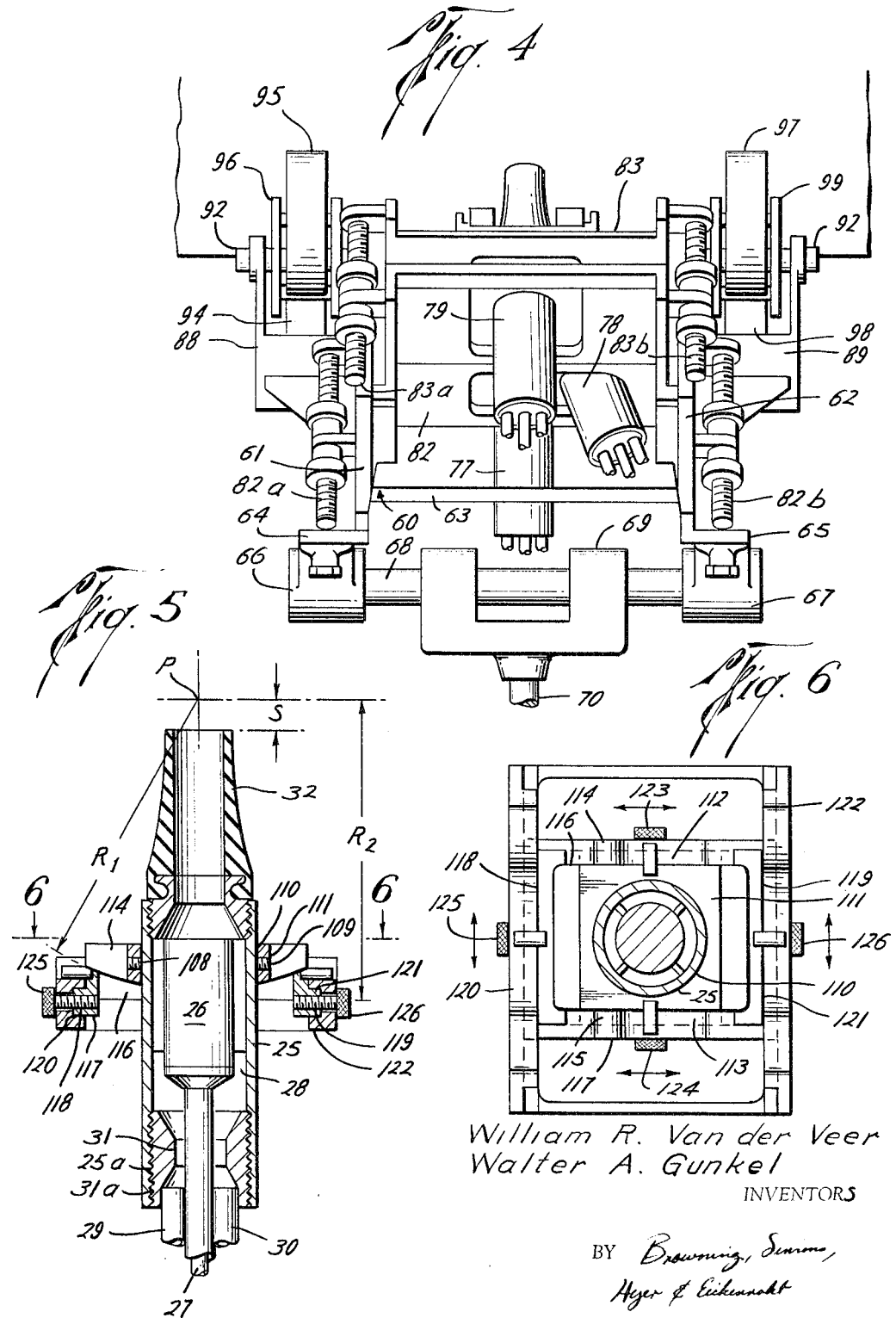

United States Patent Office 3,289,468
Patented Dec. 6, 1966

3,289,468
ULTRASONIC TRANSDUCER POSITIONING
APPARATUS
William R. Van der Veer and Walter A. Gunkel, San Antonio, Tex., assignors to Southwest Research Institute, San Antonio, Tex., a trust estate of Texas
Filed May 29, 1963, Ser. No. 284,114
9 Claims. (Cl. 73—71.5)

This invention relates to apparatus for positioning ultrasonic transducers used in the high speed non-destructive inspection of solid objects, particularly tubular or cylindrical goods.

In the high speed inspection of tubular goods such as pipe by ultrasonic techniques, it has been proposed that the pipe be scanned by rotating it past an array of transducers while simultaneously moving the pipe lengthwise. The pipe is therefore, in effect, scanned by the transducers over a spiral path. For several reasons, it is important to maintain the transducers in a position relative to the pipe surface moving past them such that there is a minimum variation in the spacing between the transducers and the pipe surface, as well as in the angle of the transducers relative to such surface.

Minimizing the variation in transducer spacing from the pipe surface may be important for various reasons. In some types of techniques, focused beam transducers are used having a beam pattern such that only a portion of the beam length can be employed to give the most desirable results. Therefore, if transducer spacing varies excessively, the usable portion of the beam length may not be properly positioned to give the desired inspection. In other techniques, a time base is employed in that the transit time of pulses of ultrasonic energy is measured to give, for example, the location of a defect. Variations of transducer spacing would therefore tend to vary this time base. While circuits can be designed to accommodate or correct for moderate variations in transducer-to-pipe spacing, excessive variations may not be able to be tolerated and would lead to erroneous results.

Another reason for maintaining transducer spacing variations within a moderate range arises from the problem of coupling a transducer to the pipe surface. In any practical application, there must be provided a liquid, e.g. water, column between the transducer and the pipe surface so as to form a coupling therebetween through which the ultrasonic energy can be transmitted. In a desired arrangement, the coupling comprises a flowing column of water and excessive variation in transducer spacing may cause failure of the coupling so as to render the equipment at least temporarily inoperable.

As indicated above, it is also sometimes important to maintain the angular disposition of the transducers, relative to the pipe surface, substantially constant. In some ultrasonic techniques, longitudinal waves are employed and, to get the maximum benefit from these, the transducer should be maintained so that its beam is always substantially perpendicular to the pipe surface. In other techniques, shear wave techniques are employed and here again, to get a maximum response, the angle of the beam relative to the pipe surface should be maintained relatively constant. In still other techniques, there may be a sending transducer and a separate receiving transducer. With focused beam transducers, in particular, excessive variation in the angular placement of the two transducers relative to each other may result in the transmitted beam being lost or being reflected so as to be without the sight pattern of the receiving transducer.

The foregoing criteria for transducer positioning becomes especially difficult to achieve when inspecting pipe. Large diameter pipe such as that used in gas transmission lines is seldom, if ever, a perfect right cylinder. It may be out of round, slightly crooked, etc., so that when it is rotated past the transducer array, the variation in spacing of the pipe surface from any particular fixed point, such as a transducer, may not only be of considerable magnitude but very erratic. Moreover, the pipe surface usually will be dirty in the sense that it may have mill scale, rust, etc. tending to make the surface uneven. Still further, there are many kinds of pipe which have a longitudinal weld seam, the cap of which may extend beyond the normal periphery of the pipe, thereby providing a ridge across which the transducer must pass.

It is an object of this invention to provide apparatus for supporting the transducers used in the ultrasonic testing of tubular and other cylindrical goods which greatly reduces variations in the spacing and angular positioning of the transducers relative to the surface of the tubular goods despite variations in the cross-sectional shape of the tubular goods and imperfections in the surface thereof.

It is a further object to provide apparatus for supporting such transducers which can be quickly and easily adjusted to accommodate pipe of different diameters and also to permit rapid and easy changing of the angular disposition of the transducer to achieve different results.

When making a change in the transducer's angular position (i.e., a change in the angle at which the ultrasonic beam enters or leaves the pipe surface), it is desirable that such change not inherently result also in a change in the transducer-to-pipe spacing. Also, the change should be made in such a way that the beam angle is always readily determinable. Both of these desirable objectives can be accomplished by preventing any shifting, during the angular adjustment, of the point at which the beam enters or leaves the pipe and it is therefore one of the objects to provide a transducer holder which makes it possible to make substantial changes in the angular or rotational position of the transducer with respect to the member being inspected without changing the point at which the ultrasonic beam enters or leaves the pipe surface.

These and other objects, advantages and features of the invention will be apparent to one skilled in the art from a study of the specification, claims and the drawings wherein:

FIG. 1 is a view in side elevation of a pipe inspection station illustrating a preferred form of the transducer supporting apparatus of the invention in position in engagement with the surface of the pipe;

FIG. 2 is a transverse section through the pipe and also a side view in elevation of the transducer supporting apparatus of FIG. 1 illustrating how the apparatus maintains the proper spacing between the transducers and the surface of the pipe and also showing a typical arrangement of some transducers on the apparatus;

FIG. 3 is a side view of another embodiment of the invention which can be adjusted for varying pipe diameters and which is also equipped with the special transducer mounting fixtures of the invention which allow the distance the transducers are held away from the surface of the pipe and the angle of the transducers to be adjusted;

FIG. 4 is an end view of the transducer supporting apparatus of FIG. 3;

FIG. 5 is a vertical cross section taken through a transducer and a mounting fixture; and FIG. 6 is a cross-sectional view taken through line 6—6 of FIG. 5.

FIG. 1 illustrates pipe handling equipment comprising a plurality of upright members 18 supporting rollers 11 which engage opposite sides of pipe 10. All of these rollers engage the pipe at an angle so that, as they are rotated, they will not only roate the pipe but will also cause the pipe to move longitudinally through the inspection station. The rollers are mounted on shafts 12 which are rotated by line shaft 16 by means of chain belt 15 and sprockets 13 and 14. The rollers on the other side of the pipe, which are not shown in the drawing, are rotated in the same manner by sprockets 17.

To better illustrate how the transducer supporting apparatus accomplishes the objects of this invention, a simplified, non-adjustable version is illustrated in FIG. 2. It consists of the base member 21 to which is attached transducer assemblies 22, 23 and 24 at spaced points along the base member. While only three assemblies are shown for the sake of simplicity, additional ones can be added at different positions along the base member and at different angles with respect to the pipe to achieve the desired array of transducrs.

The structure of these transducer assemblies is illustrated in FIG. 5. It consists of a cylindrical housing 25 within which is located a transducer crystal 26 which is connected to suitable electronic circuitry by means of electric cable 27. The transducer crystal is mounted to provide an annular space 28 between it and cylindrical housing 25. The liquid (usually water), through which the ultrasonic energy is coupled to the pipe, enters from the lower end of the cylindrical housing through tubes 29 and 30 and venturi 31 provided in end plug 31a. The end plug is connected to housing 25 by threads 25a and provides a support for transducer 26. Attached to the top of housing 25 is a flexible tube 32 which confines the flowing water column to a point near the pipe.

The venturi is provided to reduce the turbulence of the water before it enters tube 32 above the transducer as excessive turbulence interferes with the transmission of ultrasonic energy.

As the water leaves the end of the flexible tube, it engages the wall of the pipe which is only a short distance away so that a solid column of water is maintained between the crystal and the wall of the pipe.

For a more detailed description of the transducer assembly of FIG. 5, refer to copending application Serial No. 269,014, filed March 29, 1963, now Patent No. 3,255,626, and entitled "Utrasonic Apparatus," the assignee of said application being the assignee of this application.

Referring again to FIG. 2, the base member 21 is supported on guide rods 33 and 34 by means of coil springs 37 and 38 which resiliently urge the base member toward the pipe specimen 10. The guide rods are fixed to member 35 which is rotatably supported on shaft 36. Holding base member 21 spaced from the pipe specimen are rollers 40, 41, 42 and 43 which are rotatably mounted on opposite ends of arms 44 and 46, respectively. The arms in turn are pivotally attached at a point equidistant between the rollers to upright members 45 and 47 which are attached to base member 21. Similar sets of arms, rollers and upright members are mounted on the opposite side of base member 21 as indicated in FIG. 1.

To aid in the explanation of how this apparatus functions to reduce the effect of imperfections in the pipe surface and of deviations of the pipe from being an ideal right cylinder on the spacing and alignment of the transducer assemblies with respect to pipe 10, the roller axes of rollers 40 and 41 have been designated C and A, respectively, and the pivot point between the upright member 45 and arm 44 has been designated pivot point B. The same pivot point with respect to upright member 47 and arm 46 has been designated D and the pivot point of member 35 around shaft 36 has been designated E.

By way of example, assume that the pipe being inspected has a longitudinal weld cap 39 at the point where the plate forming the pipe has been welded together. When this cap moves into engagement with roller 40, it will force the roller to move away from the centerline of the pipe by the distance the protrusion extends above the pipe—a distance "d." However, since roller 40 is connected to the end of arm 44 which in turn is connected to roller 41, the midpoint of arm B will travel only half the distance (½ "d") that the roller 40 and pivot point C traveled. In other words, arm 44 will pivot around point A as weld 39 forces roller 40 outward and, since pivot point B is located halfway between points A and C, it will move only half the distance that point C moves. Thus, this end of the base member will be moved only half the distance moved by roller 40. As pivot point B moves away from the pipe, base member 21 will rotate around point D since both rollers 42 and 43 will remain in engagement with the surface of the pipe. As the base member rotates, it causes member 35 to rotate about E on the shaft 36 and also compresses coil springs 37 and 38. If the base member were not able to rotate at E, then the entire base member would have to move away from the pipe the distance moved by pivot point B.

As a result of this arrangement of the rollers and the other structure of the apparatus, the total movement of the transducers is greatly reduced. Transducer 24, of course, moves farthest away from the pipe since it is farthest away from pivot point D. Even so, it moves less than half the distance moved by the roller which engages the protrusions. Transducer 23 moves approximately half the distance moved by pivot point B, which is slightly less than half the distance moved by roller 40, so in other words, the movement of transducer 23 is reduced to one-fourth of what it would be otherwise. Transducer 22 moves a negligible amount. As protrusion 39 travels on, engaging each roller in turn, the same result is obtained. When it engages roller 41, the transducer assemblies move exactly the same distance as when roller 40 was engaged. Then when it reaches rollers 42 and 43, obviously the movement of transducers 22 and 24 just reverses.

A more refined version of the invention with added features is illustrated in FIGS. 3 and 4. Here, the support member is a U-shaped base 60 consisting of two upright flanges 61 and 62 connected together by web 63. Extending outward from each side of the upright flanges are horizontal mounting flanges 64 and 65 which are in turn bolted to bearings 66 and 67. Shaft 68 extends through both bearings 66 and 67 and also yoke 69 which is attached to piston rod 70. The entire structure is supported by means of an air cylinder 71 through piston rod 70 which is connected to a piston (not shown) within the air cylinder. An air cylinder provides an ideal support since it can be used to raise and lower the apparatus and also to provide a resilient support for the base so that it can move downward when the rollers engage a protrusion on the pipe in the same manner as springs 37 and 38 allowed base 21 to move downwardly in the apparatus shown in FIG. 2.

Supported by base member 60 are transducer assemblies 75, 76, 77, 78 and 79. Transducer assembly 77 is mounted directly to the base member. However, the other transducer assemblies are mounted on adjustable plates 80, 81, 82 and 83 so that their position can be adjusted to allow for different pipe diameters. Each adjusting plate has one end pivoted and the other supported by two adjusting screws designated 80a, 80b, 81a, 81b, 82a, 82b, 83a and 83b.

Located on each side of the base member and at each end thereof are brackets 88, 89, 90 and 91. These brackets support shafts 92 and 93 which in turn support the roller assemblies which maintain the base member the proper distance away from the pipe specimen. A pair of rollers is arranged adjacent each bracket on each end of the shafts. The rollers are mounted on an arm which in turn is mounted on the shaft. For example, adjacent bracket 88 and mounted on shaft 92 is arm 96 which rotatably supports rollers 94 and 95. The same arrangement is provided on the other end of the shaft adjacent bracket 89 by means of rollers 97 and 98 and arm 99.

On the other end of the base member, bracket 90 has been broken away in FIG. 3 to illustrate the arrangement of the transducer assemblies. However, shown on the other end of shaft 93 are rollers 100 and 101 which are in turn mounted on arm 102 which is supported by shaft 93. The brackets are all adjustable so that the distance between the base and the wall of the pipe specimen can be adjusted to accommodate pipe of different diameters.

As illustrated in FIGS. 3 and 4, the transducers are arranged so that the ultrasonic pulses or beams they generate will enter the wall of the pipe specimen at different angles. For example, transducer 77 is arranged so that the pulses it generates will enter the wall of the pipe specimen perpendicular to the wall. This transducer can be used to measure wall thickness since it will receive reflections from the outer surface of the pipe as well as from the inner surface and the time interval between the reflected pulses can be used to measure the wall thickness. Transducer 75 is inclined so that the pulses or beams it transmits will enter the wall of the pipe specimen at an angle and travel laterally around the circumference of the pipe specimen. This is also true of transducer 79. Transducers 76 and 78 are arranged so that their pulses or beams enter the pipe specimen at an angle and travel longitudinally down the wall of the pipe.

Since the ultrasonic pulses or beams are entering the pipe at various angles, it is very important that the point of inspection (the point at which the wave impulses enter the pipe) be accurately known. This is accomplished by means of the transducer mounting fixtures illustrated in FIGS. 5 and 6.

These fixtures comprise three members, transducer carrying member 111 which supports the tranducer, member 112 which in turn supports member 111, and base member 122 which supports the entire fixture. The cylindrical housing 25 of the transducer assembly is mounted in opening 110 of rectangular member 111 by means of set screws 108 and 109. The set screws allow adjustment in the distance between the end of the transducer assembly and the surface of the pipe. The member 111 is provided on opposite sides with outwardly extending arcuate flanges 112 and 113 which have a radius $R_1$ which is the distance from the arcuate flanges to the point P of beam entry into the pipe wall. Arcuate flanges 112 and 113 are received in correspondingly arcuate grooves 114 and 115 located on opposite sides of rectangular opening 116 in support member 117. Member 117 is also provided with outwardly extending arcuate flanges 118 and 119 on opposite sides which in turn are received in arcuate grooves 120 and 121 located in base member 122. These arcuate flanges 118 and 119 and the correspondingly arcuate grooves 120 and 121 have a radius of curvature equal to $R_2$ which is the distance from these arcuate flanges and grooves to the point P of beam entry into the pipe. Thus, the mounting fixture allows the transducer to be positioned at any angle within the degree of travel of the arcuate flanges in the arcuate grooves and yet have its longitudinal axis lie on a spherical radius which will pass through point P. In other words, assuming the movement of the transducer carrying member 111 along the arcuate path provided by grooves 114 and 115 is the X axis and the travel of support member 117 along the arcuate grooves 120 and 121 is the Y axis, then with the longitudinal axis of the transducer arranged to pass through point P, the transducer can be moved along with members 111 and 117 to any position on the X–Y axis within the limits of travel of the members and still have its axis pass through the point P.

In operation, the mechanism illustrated in FIGS. 3 and 4 functions in the same manner as the mechanism shown in FIG. 2. When a protrusion or other nonconformity such as weld 39 engages rollers 95 and 97, it will force them away from the surface of the pipe by the distance "d," the height of the imperfection. The arms 96 and 99 will rotate around pivot point A which is the point where these arms are rotatably connected to rollers 94 and 98, moving shaft 92 downward half the distance "d." The pivot point E will move around pivot point D a lesser amount, at the same time causing rod 70 in air cylinder 71 to move downwardly compressing the air in the cylinder and slightly increasing the upward force on the apparatus.

As explained above, the purpose of arranging the rollers in this manner is to minimize the effect of irregularities found on the surface of the pipe. That the mechanism accomplishes this is apparent from the fact that the maximum travel of any transducer is reduced to half the height or depth of the irregularity.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense The invention having been described, what is claimed is:

1. Apparatus for supporting a transducer adjacent the external surface of a pipe to be inspected by the ultrasonic energy produced by the transducer, comprising in combination, a support member; means mounting the support member to extend transversely of the pipe and for pivotal movement about an axis extending longitudinally of the pipe and including resilient means biasing the support member toward the pipe; an ultrasonic transducer mounted on the support member; spacing means attached to the support member and disposed on opposite sides of the pivotal axis of the support member to engage the pipe and hold the support member away from the pipe being inspected, said spacing means comprising arms pivotally connected intermediate their ends to the support member and pipe engaging means attached to the arms on opposite sides of the point where the arms are pivotally connected to the support member.

2. The device of claim 1 in which the pipe engaging means are rollers rotatably mounted on the arms.

3. The device of claim 1 in which the support member mounting means includes a piston-cylinder assembly pivotally connected to the support member.

4. The device of claim 1 further provided with means for supporting the transducer, comprising a first member attached to the transducer and provided with outwardly extending arcuate flanges on opposite sides thereof; a second member provided with an opening to receive the first member and arcuate grooves on each side of the opening the engage the arcuate flanges on the first member to thereby support the first member, said second member being provided with outwardly extending arcuate flanges on opposite sides of the member; and a third member attached to the support member and provided with an opening to receive the second member, and arcuate grooves to receive the arcuate flanges of the second member to allow the angle of the transducer with respect to the pipe to be changed without changing the point at which the ultrasonic energy from the transducer enters the pipe.

5. Apparatus for supporting a plurality of transducers adjacent the external surface of a joint of pipe, comprising support means; a plurality of transducers mounted on the support means; means for pivotally mounting the support means about an axis parallel to the longitudinal axis of the pipe, and for resiliently biasing the support means toward the pipe; and means for spacing the support means from the surface of the pipe comprising two roller supporting members, each member being pivotally attached intermediate its ends to the support means on opposite sides of the mounting means, and a roller rotatably attached to each end of the member for engaging the surface of the pipe.

6. The device of claim 5 further provided with transducer supporting fixtures mounted on the support means, the fixtures comprising an intermediate support member having an arcuate track, a transducer supporting member slidably mounted on the arcuate track of the intermediate support member, the arcuate track having a radius of curvature which will cause the longitudinal axis of the transducer to pass through a predetermined point regardless of the position of the support member on the track; and a base member attached to the support means of the apparatus and having an arcuate track supporting the intermediate support member, the arcuate track of the base member also having a radius of curvature such that the longitudinal axis of the transducer passes through said point regardless of the location of the transducer support member on the arcuate track of the base and also being disposed at an angle with the first mentioned arcuate track.

7. The device of claim 6 in which movement of the transducer along the arcuate path of the transducer support member is in a plane perpendicular to the plane in with the transducer moves when the intermediate support member moves along the arcuate path of the base member.

8. Apparatus for supporting a plurality of sources of ultrasonic energy adjacent the surface of a cylindrical object to be inspected, comprising, in combination, a pivotally mounted support member pivoted about an axis parallel to the longitudinal axis of the object being tested for the sources of ultrasonic energy; means for resiliently biasing the support member toward the object being tested; and spacer means on each end of the support member arranged to space the support member a predetermined distance from the specimen, said spacer means comprising a roller supporting member pivotally mounted intermediate its ends at each end of the support member and rollers rotatably attached to each end of the roller supporting member to engage the surface of the object being tested and space the support from the object being tested; said support member and said roller supporting member having parallel pivoted axes.

9. Apparatus for positioning a transducer with respect to a rotating length of pipe being inspected with ultrasonic energy, comprising a support member for the transducer pivotally mounted for movement in a plane transverse of the pipe; resilient means biasing the support member toward the pipe; and spacer means holding the support member away from the pipe including arms pivotally mounted intermediate their ends of the support member a plurality of rollers rotatably mounted in pairs on said arms, the rollers being mounted to roll with the rotating pipe and cause the arms to pivot in a plane parallel to the plane in which the support member pivots when a surface irregularity on the pipe causes one of the rollers to change its distance from the center line of the pipe.

References Cited by the Examiner

UNITED STATES PATENTS

| 2,908,161 | 10/1959 | Bincer | 73—67.8 |
| 3,182,490 | 5/1965 | Gibson | 73—67.8 |
| 3,257,843 | 6/1966 | Cowan | 73—71.5 |

FOREIGN PATENTS

| 1,065,907 | 5/1954 | France. |
| 766,984 | 1/1957 | Great Britain. |

RICHARD C. QUEISSER, *Primary Examiner.*

JOHN P. BEAUCHAMP, *Examiner.*